United States Patent [19]

Prohaska et al.

[11] 4,450,714

[45] May 29, 1984

[54] APPARATUS FOR MEASURING THE MASS OF A FLOWING MEDIUM

[75] Inventors: Werner Prohaska, Bietigheim-Bissingen; Peter Romann, Stuttgart, both of Fed. Rep. of Germany

[73] Assignee: Robert Bosch GmbH, Stuttgart, Fed. Rep. of Germany

[21] Appl. No.: 356,987

[22] Filed: Mar. 11, 1982

[30] Foreign Application Priority Data

Mar. 13, 1981 [DE] Fed. Rep. of Germany ....... 3109608

[51] Int. Cl.³ .............................................. G01F 1/68
[52] U.S. Cl. .................................... 73/118.1; 73/204; 338/25
[58] Field of Search ............... 73/204, 118 A; 338/25, 338/28

[56] References Cited

U.S. PATENT DOCUMENTS

| | | | |
|---|---|---|---|
| 3,709,035 | 1/1973 | DeFries et al. | 73/204 |
| 3,824,966 | 7/1974 | Schnelder et al. | 123/494 |
| 4,074,566 | 2/1978 | Obayashi et al. | 73/204 X |
| 4,252,016 | 2/1981 | Sauer et al. | 73/204 |
| 4,299,125 | 10/1981 | Romann et al. | 73/204 |
| 4,325,253 | 4/1982 | Romann et al. | 73/204 |

*Primary Examiner*—Gerald Goldberg
*Assistant Examiner*—B. Tumm
*Attorney, Agent, or Firm*—Edwin E. Greigg

[57] ABSTRACT

An apparatus for measuring the mass of a flowing medium, in particular for measuring the aspirated air mass of an internal combustion engine. The apparatus has a hot wire disposed in the flow of the medium, the temperature of which is regulated in accordance with the mass of the medium; and its resistance is regulated by an adjustment variable which is a standard for the mass of the medium. The hot wire is guided on a sensor ring, which is of plastic, via support points. The support points are each fastened with a fastening section in a fastening slit of the sensor ring extending in the axial direction, and they each have a guide section protruding into the interior of the sensor ring through a radial slit. A guide wire extending in the flow direction is fastened to each guide section. The terminal support points in like manner, have attachment sections by way of which an electrical connection is made with the hot wire.

6 Claims, 9 Drawing Figures

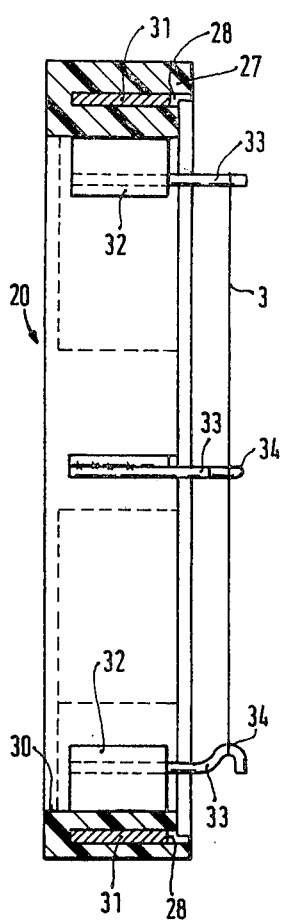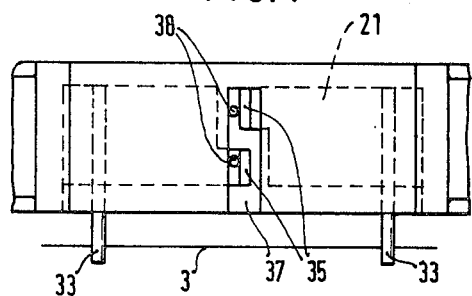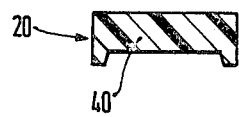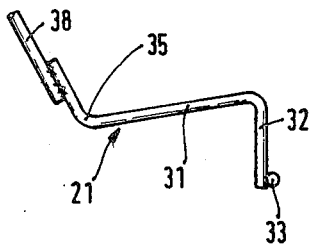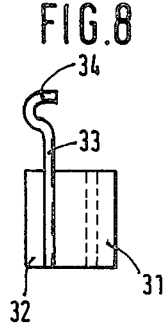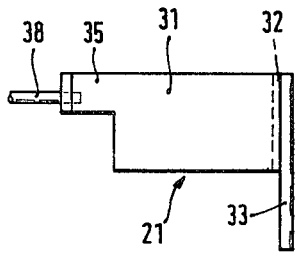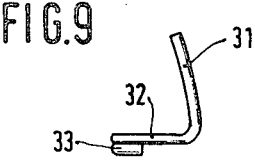

APPARATUS FOR MEASURING THE MASS OF A FLOWING MEDIUM

BACKGROUND OF THE INVENTION

The invention is based on an apparatus as described herein. An apparatus for measuring the mass of a flowing medium is known, but in which the sensor ring is made of metal; this means that special and expensive efforts must be made to effect both heating insulation and electrical insulation when securing the support points on the sensor ring.

OBJECT AND SUMMARY OF THE INVENTION

The apparatus according to this invention has the advantage over the prior art that it is possible to secure the support points on the sensor ring both rapidly and in a cost-favorable manner, without having to take additional steps to provide heat insulation and electrical insulation of the support points with respect to the sensor ring.

Advantageous further embodiments of and improvements to the apparatus disclosed are attained by means of the characteristics set forth herein.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 3 is a section taken along the line III—III of FIG. 2;

FIG. 4 is a section taken along the line IV—IV of FIG. 2;

FIG. 5 is a section taken along the line V—V of FIG. 2;

FIG. 6 shows one terminal support point in a lateral view;

FIG. 7 shows a terminal support point in plan view;

FIG. 8 shows a center support point in a lateral view; and

FIG. 9 shows a center support point in plan view.

DESCRIPTION OF THE PREFERRED EMBODIMENT

Figure 1:
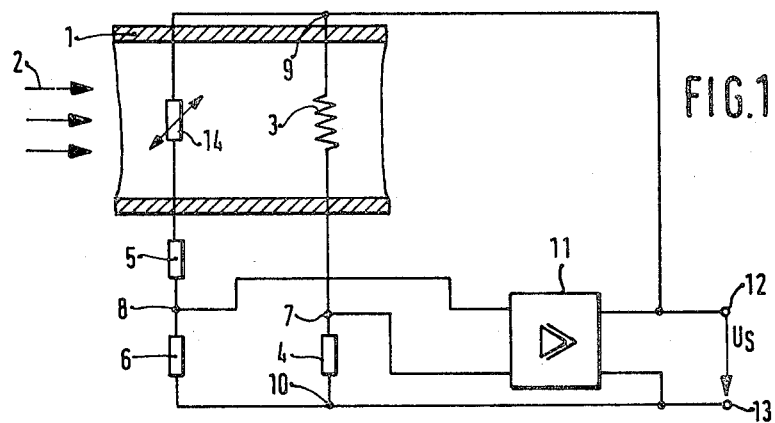
FIG. 1 shows the basic circuitry for an apparatus for measuring the mass of a flowing medium having a temperature-dependent resistor.

In FIG. 1, an intake tube 1 of an internal combustion engine not shown in further detail has air which has been aspirated by the engine flowing into it in the direction indicated by the arrow 2. A temperature-dependent resistor 3, for instance a hot-film resistor or a hot wire, is located in the intake tube; the output variable of a regulator flows through this resistor 3, and the resistor 3 simultaneously furnishes the input variable for the governor. The temperature of the temperature-dependent resistor 3 is regulated to a fixed value, which is above the average air temperature, by the regulator. If the flow speed—that is, the quantity of air aspirated per unit of time—increases, then the temperature-dependent resistor 3 is cooled to a greater extent. This cooling is fed back to the input of the regulator; in consequence, the regulator increases its output variable such that the predetermined temperature is again established at the temperature-dependent resistor 3. The output variable of the regulator always regulates the temperature of the temperature-dependent resistor 3 to the predetermined value when there are changes in the aspirated air quantity; at the same time, the output variable represents a standard for the aspirated air quantity, which is delivered in the form of a measurement variable to a measurement circuit of the engine in order to adapt the required fuel quantity to the quantity of air aspirated per unit of time.

Together with a resistor 4, the temperature-dependent resistor 3 forms a first bridge branch, and a second bridge branch made up of two fixed resistors 5 and 6 is switched parallel to the first bridge branch. Between resistors 3 and 4, there is a pickup point 7 and between resistors 5 and 6 there is a pickup point 8. The two bridge branches are switched in parallel at points 9 and 10. The diagonal voltage of the bridge which appears between points 7 and 8 is delivered to the input of an amplifier 11, to the output terminals of which the points 9 and 10 are connected, so that amplifier output variable supplies the bridge with operating voltage or operating current. The output variable, which from now on will be designated as the adjustment variable $U_S$, can be picked up between the terminals 12 and 13, as FIG. 1 indicates. The adjustment variable $U_S$ controls the metering of the fuel required for the aspirated air in a fuel metering circuit (not shown) of the engine. The temperature-dependent resistor 3 is heated up by the current flowing through it up to a value at which the input voltage of the amplifier 11 (which is the bridge diagonal voltage) becomes zero or assumes a predetermined value. A specific current then flows from the output of the amplifier into the bridge circuit. If the temperature of the temperature-dependent resistor 3 varies because of a variation in the quantity of the aspirated air, then the voltage at the bridge diagonals also varies, and the amplifier 11 regulates the bridge supply voltage or bridge current to a value at which the bridge is again either in balance or else unbalanced in a predetermined manner. The output variable of the amplifier 11, that is, the control variable $U_S$, thus represents a standard for the aspirated air mass, just as does the current in the temperature-dependent resistor 3.

In order to compensate for the influence of temperature of the aspirated air on the measurement result, it may be efficacious to incorporate a second resistor 14 in the second bridge circuit, this resistor 14 experiencing the flow of aspirated air around it. The size of the resistors 5, 6 and 14 should be selected such that the output loss of the temperature-dependent resistor 14 caused by the branch current flowing through it is so low that the temperature of this resistor 14 practically does not vary with variations in the bridge current but instead always corresponds to the temperature of the air flowing past it.

Figure 2:
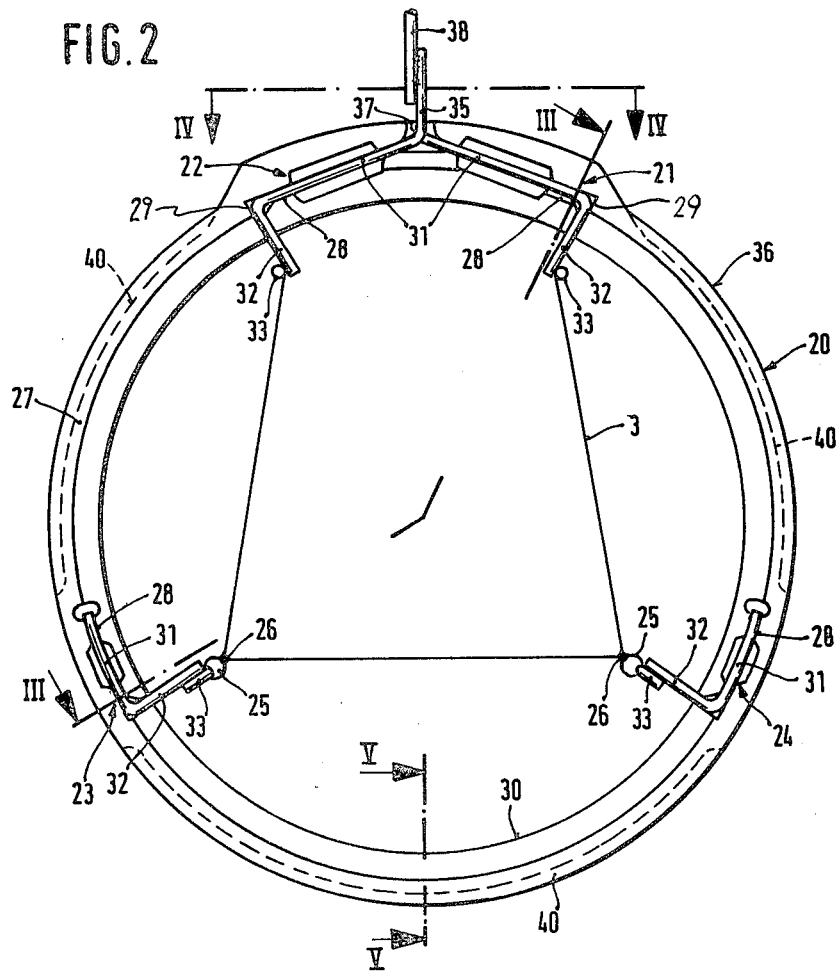
FIG. 2 shows an embodiment according to the invention of an apparatus for measuring the mass of a flowing medium.

In FIG. 2, a sensor ring 20 is shown, with four support points 21, 22, 23, 24. Naturally, this element 20 may also have some other efficacious shape as well. With the aid of the support points 21, 22, 23, 24, the hot wire 3 is stretched out on the sensor ring 20. The hot wire 3 is secured at its ends only on the two terminal support points 21 and 22, being welded or soldered, for example; it is only loosely guided over the support points 23, 24. The hot wire 3 is guided over the center support points 23, 24 in the form of a loop 25 in each case; the wire sections of the loop 25 that lead away from each support point and intersect one another may be connected to one another in an electrically conductive manner at a contact area 26, for instance by being welded or soldered to one another. As a result, the loop 25 has no current flowing through it and is not heated up by any such current. Difficulties with an undefined conduction of heat away from the hot wire to the center support points 23, 24 are thereby avoided. In accordance with the invention, the sensor ring 20, which either forms a part of the intake tube 1 or is disposed inside the intake tube 1, is made of plastic. The sensor ring 20 may be embodied as an extrusion-molded part and has fastening slits 28 which extend in the axial direction and are open at least toward one end face 27 of the sensor ring 20. From each of these axial fastening slits 28, one radial slit 29 (which is likewise open toward one end face 27) leads toward the inside diameter 30 of the sensor ring 20 which surrounds the flow cross section. As shown in FIG. 3, one support point 21, 22, 23, 24 is inserted, each with a fastening section 31, into each fastening slit 28. The fastening of the fastening section 31 in the sensor ring may be effected either by embodying the fastening slits 28 as press-fittings or, for example, by being glued or tamped into place, supplying heat from the plastic material to surround the fastening section 31. Connected at an angle with the fastening section 31, each support point 21, 22, 23, 24 has a guide section 32, which protrudes through the respective radial slit 29 into the interior of the sensor ring 20. The fastening section 31 and the guide section 32 of the metal support points 21, 22, 23, 24 have a rectangular cross section and may be fabricated by casting or stamping. A metal guide wire 33 extending in the flow direction is connected, for example by welding or soldering, with each guide section 32 of each support point 21, 22, 23, 24. The guide wires 33 provided at the center support points 23, 24 are provided at their free ends with hooks 34 which guide the loops 25 of the hot wire 3. The ends of the hot wire 3 are secured by the guide wires 33 of the terminal support points 21, 22 by welding or by soldering, for example. The terminal support points 21, 22 associated with the ends of the hot wire 3 also have an attachment section 35 which is connected with the fastening section 31 and remote from the guide section 32. The respective attachment section 35 is bent at an angle relative to the fastening section 31 and protrudes through a slit 37 extending from the fastening slit 28 to the circumference 36 of the sensor ring 20. An electrical line 38 is connected with each attachment section 35 and the triggering of the hot wire 3 is effected thereby. In FIG. 2, sections 40 of the circumference of the sensor ring 20 are indicated by broken lines, and outside the areas receiving the fastening slits 28, these sections 40 have a U-shaped cross section, as shown in FIG. 5. The arms of the U-shaped cross section assure sufficient rigidity on the part of the sensor ring 20.

As shown in FIG. 4, the attachment sections 35 can be provided offset from one another at each terminal support point 21, 22, so that they protrude in a row relative to one another through the slit 37. In FIGS. 6 and 7, the terminal support point 21 is shown by way of example, while FIGS. 8 and 9 show the middle support point 24.

The guidance of the hot wire 3 may likewise be effected outside the sensor ring 20, supported in front of the end face 27, as shown in FIG. 3.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for measuring the mass of a flowing medium in a flow path, such as the aspirated air mass of an internal combustion engine, including a sensor ring encompassing a flow cross-section and at least one temperature-dependent resistor disposed in the flow path of the medium and embodied as a hot wire, the temperature and/or resistance of which is regulated in accordance with the flowing mass and an adjustment variable is a standard for the mass of the flowing medium, said hot wire being supported on said sensor ring in the form of a loop from one end to the other by at least three support points, said sensor ring is formed of plastic and has fastening slits formed therein extending in an axial direction with respect to the sensor ring with said fastening slits open toward at least one end face of the sensor ring, a radial slit leading from said axially directed slit to an inside diameter of the sensor ring, each said support point including a guide section which protrudes into the flow cross section through said radial slit and a fastening section secured in the fastening slit such that the fastening section of said support point is bent at an angle relative to the guide section of said support point.

2. An apparatus as defined by claim 1, in which the guide section and the fastening section of the support points are metal and have a rectangular cross section, and a metal guide wire extending in the flow direction and connected to said guide section.

3. An apparatus as defined by claim 2, in which at least one said metal guide wire is embodied as a hook on its free end.

4. An apparatus as defined by claim 3, in which the hot wire is guided over the hook of the guide wire in the form of a loop, with intersecting wire sections of the loop being interconnected in an electrically conductive manner.

5. An apparatus as defined by claim 2, in which to terminal support points associated with the hot wire ends have an attachment section connected at an angle with the fastening sections, remote from the guide section which protrudes through said radial slit extending from the fastening slit toward the inside diameter of the sensor ring and an electrical connection secured to attachment section.

6. An apparatus as defined by claim 1, in which the cross section of the sensor ring, outside the areas receiving the fastening slits, is embodied as U-shaped.

* * * * *